(12) United States Patent
Campan et al.

(10) Patent No.: US 10,571,358 B2
(45) Date of Patent: Feb. 25, 2020

(54) METHOD FOR DETECTING ANOMALIES IN A DISTRIBUTION NETWORK

(71) Applicant: SUEZ GROUPE, Paris la Defense (FR)

(72) Inventors: Francis Campan, Antony (FR); Abel Dembele, Villeurbanne (FR); Guillaume Cussonneau, Paris (FR)

(73) Assignee: SUEZ GROUPE, Paris la Defense (FR)

( * ) Notice: Subject to any disclaimer, the term of this patent is extended or adjusted under 35 U.S.C. 154(b) by 230 days.

(21) Appl. No.: 15/328,520

(22) PCT Filed: Jul. 23, 2015

(86) PCT No.: PCT/IB2015/055583
§ 371 (c)(1),
(2) Date: Jan. 24, 2017

(87) PCT Pub. No.: WO2016/012972
PCT Pub. Date: Jan. 28, 2016

(65) Prior Publication Data
US 2017/0212003 A1   Jul. 27, 2017

(30) Foreign Application Priority Data

Jul. 25, 2014   (FR) .................................... 14 57209

(51) Int. Cl.
*G01M 3/28*   (2006.01)
*G06F 17/16*   (2006.01)
*G06F 17/18*   (2006.01)

(52) U.S. Cl.
CPC ........... *G01M 3/2807* (2013.01); *G06F 17/16* (2013.01); *G06F 17/18* (2013.01)

(58) Field of Classification Search
CPC .. G06Q 50/06; G06Q 10/0639; G06Q 10/063; G06F 2221/034; F17D 5/02; G01M 3/243; G01M 3/28
See application file for complete search history.

(56) References Cited

U.S. PATENT DOCUMENTS

| 5,866,803 A | 2/1999 | Namba et al. |
| 8,341,106 B1 * | 12/2012 | Scolnicov ............. G06N 7/005 702/50 |

(Continued)

FOREIGN PATENT DOCUMENTS

EP   2 477 020 A1   7/2012

OTHER PUBLICATIONS

International Search Report, dated Oct. 19, 2015, from corresponding PCT application.

*Primary Examiner* — Elias Desta
(74) *Attorney, Agent, or Firm* — Young & Thompson

(57) ABSTRACT

Disclosed is a method for detecting anomalies in a distribution network equipped with sensors. The steps are:
acquiring for each sensor a time series of physical measurements separated by time intervals;
defining time windows each corresponding to a plurality of successive time intervals;
extracting operational characteristics of each time series in each time window;
forming, for each time window, at least one current vector having for coordinates the operational characteristics, structural data relating to the network and situational characteristics specific to the time window;
comparing the current vector with preceding vectors corresponding to preceding time windows and the situational characteristics and structural data of which are similar to those of the current vector; and (Continued)

signalling an anomaly in cases where the current vector is significantly dissimilar to the preceding vectors.

22 Claims, 1 Drawing Sheet

(56) References Cited

U.S. PATENT DOCUMENTS

| | | | |
|---|---|---|---|
| 9,366,595 B2 * | 6/2016 | Bourgeois | F17D 5/02 |
| 2013/0291974 A1 | 11/2013 | Bourgeois | |
| 2014/0107945 A1 * | 4/2014 | Gregori | G01N 29/14 702/34 |

* cited by examiner

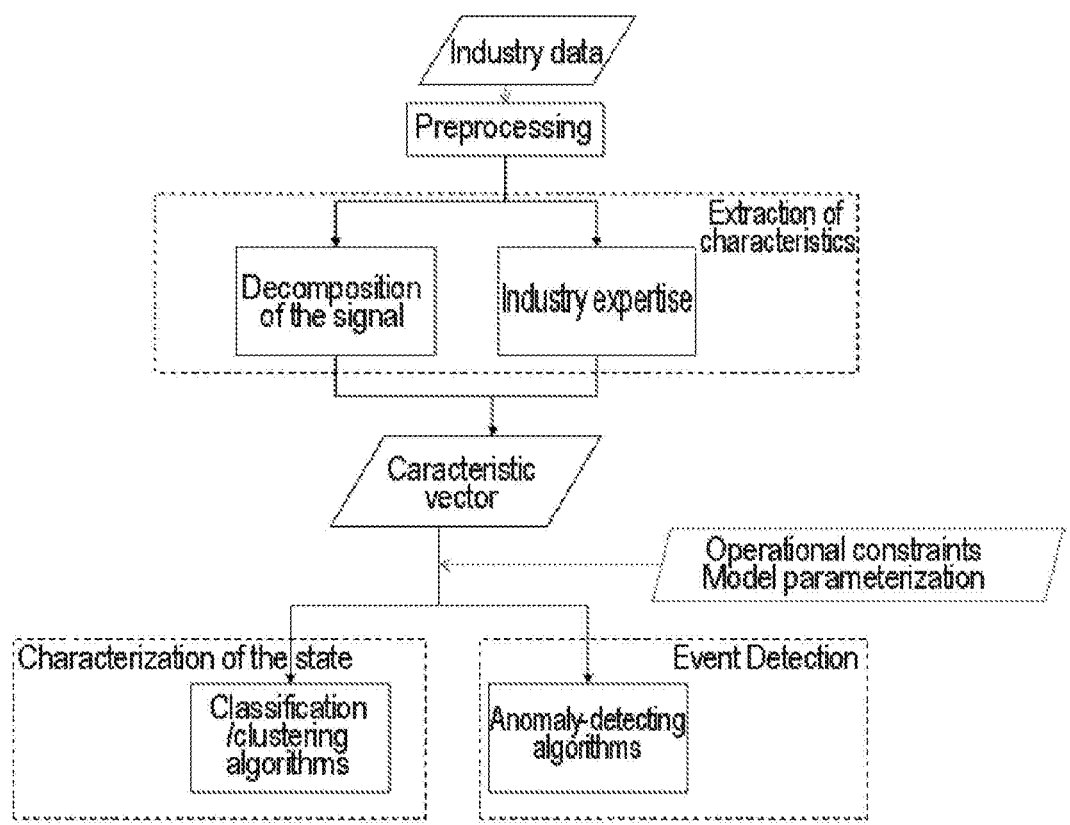

METHOD FOR DETECTING ANOMALIES IN A DISTRIBUTION NETWORK

FIELD OF THE INVENTION

The present invention relates to a method for detecting anomalies in a distribution network, in particular distributing a Newtonian fluid, and more particularly a network for supplying drinking water.

Operational performance is at the heart of management of systems for supplying drinking water. The performance level of networks for transporting and distributing drinking water may be substantially improved by virtue of tools for detecting and localizing hydraulic anomalies.

The invention may be used in any Newtonian fluid network, for example urban heating networks and air conditioning networks.

As regards detection of anomalies, methods for detecting anomalies based on statistical techniques, such as analysis of the minimum flow rate in a district of the network, are known and widely used by operators of drinking water networks. These methods do not always allow the anomaly to be characterized or localized.

Detection methods based on hydraulic models are also known. These methods, which are based on hydraulic equations, use a model of the network, which is not always available. Anomaly detection and localization combines mathematical tools and physical measurements, thereby implying the installation of a suitable density of measuring instruments.

The aim of the invention is to provide a method for detecting anomalies that is highly effective while being undemanding in terms of input data and relatively economical in terms of computational processing power.

According to the invention, the method for detecting anomalies in a distribution network, in particular distributing a Newtonian fluid, and more particularly a network for supplying drinking water, the distribution network being equipped with sensors, in which method a time series of physical measurements separated by time intervals is acquired for each sensor, is characterized by the following steps:
  defining time windows each corresponding to a plurality of time intervals;
  extracting operational characteristics of each time series in each time window;
  forming at least one current vector, for each time window, having for coordinates the operational characteristics, structural data relating to the network and situational characteristics specific to the time window;
  comparing the current vector with preceding vectors corresponding to preceding time windows and the situational characteristics and structural data of which are similar to those of the current vector; and
  signalling an anomaly in cases where the current vector is significantly dissimilar to said preceding vectors.

For the comparison of the current vector with the preceding vectors, a sensitivity parameter is defined corresponding to a minimum degree of dissimilarity beyond which the current vector is qualified as significantly dissimilar.

The time interval between two measurements of a time series is for example a few minutes, for example 3 min.

A time window is typically one day or one week. Thus a time series typically comprises many measurements. It is advantageously possible to implement the method for time windows of different durations During a time window, the parameters measured by the sensors, which parameters make up the time series, undergo variations, for example as a function of situational parameters such as the time of day, the day of the week, the season, the weather, etc., as a function of structural data of the network, such as for example closure of a valve or stopping of a pump, and also as a function of one or more anomalies in the network.

According to the invention, a vector having dimensions representative of the time series, dimensions representatives of the situational parameters and dimensions representatives of the structural data is formed.

The idea behind the invention is that if the dimensions representative of the situational parameters and structural data have been suitably chosen, vectors having substantially the same coordinates as regards their situational and structural dimensions should also have substantially the same coordinates as regards their operational dimensions. In the contrary case an anomaly is signalled.

On account of the typically large number of numerical values in each time series, the method would have to process vectors having a very large number of dimensions if all these numerical values were each a coordinate of a respective dimension of the vector. Thus, another idea behind the invention consists in extracting characteristics of each time series, and then in using these characteristics for coordinates of the vector.

The characteristics extracted from the time series may comprise maxima, minima and/or averages, and/or even elementary frequencies in particular obtained by decomposition of the time series into Fourier series. Certain situational parameters or structural data, for example the ambient temperature or the state of a valve, may also be available in the form of time series that are processed in order to extract therefrom characteristics that will form the coordinates of the vector in place of raw measurements or data.

For the extraction of these characteristics, time series of measurements may even be aggregated. It is for example possible to add consumptions known from remote meter readings and thus obtain a single total measurement, or even a time series of total consumptions, for example one measurement per day in the case of a time window of one week.

Advantageously, certain situational characteristics are at least in part based on hypotheses resulting from experience. For example, trends in the water consumption of a private individual as a function of the time of day, the day of the week, the season, outside temperature, rainfall, the number of occupants of the dwelling, etc. may be known.

In one advantageous embodiment, in case of an anomaly, the current vector is compared with at least one preceding vector having similar situational characteristics and structural data, and operational characteristics as close as possible to those of the current vector, and at least one operational characteristic that differs greatly between the current vector and said at least one preceding vector is signalled.

Preferably, situations giving rise to at least one anomaly being signalled are processed by an anomaly-characterizing software package. Such a software package functions much more effectively when it processes only situations selected as abnormal with, furthermore, information already available regarding the parameters (or vector coordinates) having an abnormal value.

The result, anomaly of a vector or network anomaly determined after processing by a characterizing software package as indicated above, is preferably delivered with reference to a severity scale of the anomaly. Having quantified the anomaly severity, in case of a plurality of simultaneous anomalies it is possible to prioritize the anomalies relative to one another as a function of their urgency and/or as a function of the magnitude of the corresponding corrective intervention.

In one preferred embodiment, an anomaly-free vector is classed in the same memory compartment as other substantially equipollent vectors, and each time a current vector is calculated the memory compartment containing the prior vectors that resemble said current vector the most is searched, and the current vector is compared only with the preceding vectors of this compartment. The processing power required and the time taken to obtain results are thus decreased.

A new memory compartment is created for a vector if its situational coordinates and/or coordinates corresponding to structural data of the network do not correspond to an existing compartment. For example exceptionally cool weather for a summer month may give rise to the creation of a new compartment.

It is advantageous to analyse the variation over time of the vectors of a given compartment and to provide information on the variation in the network. It is thus for example possible to detect leaks that are initially small but tend to get worse and are liable to become large, whereas simply searching for the most similar vector in the compartment will not reveal the worsening leak, since the most recent preceding vector will appear very similar and will lead to the conclusion that no anomaly is present.

In an even more advantageous version, the variations in the various compartments are compared and information is provided that distinguishes the variation due to the state of the network from the variation due to the consequences of the situational parameters on the network. For example a consumption that increases only on hot days indicates a variation in the habits of consumers rather than a network increasingly plagued by leaks.

To decrease processing resource intensity and refine the results, it is very advantageous to provide for each time window a plurality of vectors, each corresponding to a respective subnetwork forming part of the network. Thus smaller vectors are processed and additional chances are gained to localize anomalies more easily.

In case of detection of an anomaly the current vector is analysed comparatively with comparatively recent abnormal vectors in order to provide an indication of a rate of variation of the anomaly and/or of a link between the anomaly and at least one situational parameter and/or structural datum.

In case of an anomaly, comparable anomalies that gave rise to a diagnosis may also be sought among the preceding vectors in order to provide a pre-diagnosis for the cause of the current anomaly.

According to the invention, in an initialization step it is advantageously possible to load a memory with vectors formed from archives relating to the network.

The components of a vector preferably include at least one component relating to the complaints of consumers supplied by the network, for example complaints regarding flow rate, pressure, taste, etc.

Other particularities and advantages of the invention will become more clearly apparent from the following description, which relates to non-limiting examples, given with reference to the sole FIGURE, which shows a flow chart of the main steps of the example described.

Preliminary Observation

The following description is intended to be considered as providing a description of any particularity that it contains, said particularity possibly being considered separately from other particularities thereof, even those forming part of the same paragraph or the same phrase, and as providing a description of any combination of such particularities, provided that such a particularity or combination of particularities is distinctive from the prior art and has a technical effect, whether separately or in combination with the concepts presented above, and independently of whether this particularity is expressed in the same terms as this description or in relatively general terms.

Definitions

Entity: Drinking water network or component of the system for supplying drinking water, for example water districts or measuring instruments/sensors. One or more time series are associated with an entity.

Time series: Finite sequence of time-indexed scalar data, generally spaced apart by a constant duration.

Classification: Unless otherwise specified, designates the process leading to there being assigned to a state of an entity a known class giving rise to preset actions on the part of the network operator.

Classification generation (clustering): Unless otherwise specified, designates the process leading to a group of prior states being associated with a state of an entity, in order to determine the abnormal or new character thereof.

Measurement: This is the estimation of the value of a quantity in corresponding units, these values forming a time series delivered by a data acquisition system. A measurement is associated with a particular elementary component of the drinking water network (segment or section for a flow rate measurement, node for a pressure measurement, reservoirs for a level measurement).

Remote reading data: Series of meter readings, said readings being taken with a given periodicity and teletransmitted for example at least once a day.

Characteristic: Scalar or vector forming a piece of information that is relevant to the studied context, here the state of the network in a given time window.

Principles

In this embodiment the invention implements the following principles:

Preprocessing of the signal using prior-art methods allowing it to be padded and cleaned of noise.

Producing a vector of characteristics of the operating state of an entity for a given time window. This is done by aggregating:

characteristics extracted mainly from time series of the entity by decomposition methods/processing of the signal; and characteristics resulting from industry performance indicators and situational data.

Using classification and clustering algorithms implementing machine learning techniques, these algorithms being applied to the characteristic vectors of the entities for a given time window. This then allows the states of the entities (such as represented by the characteristic vectors) to be placed in categories known to the network operators, in order to class the situations and prioritize the corrective actions to be carried out. The classification/clustering algorithms are trained with cost functions and operational constraints on management of the network, for example the personnel available for a simple maintenance operation, the time required to assemble a team for a more complex operation, the expected delay between the date of appearance of an anomaly and the date of its detection, etc.

Optionally using contextual data influencing the operation of the entity to describe its state.

Using anomaly-detecting/scoring algorithms implementing machine learning techniques trained/optimized using criteria expressing operational constraints of the network operators. These algorithms are applied to the characteristic vectors.

Input and parameter data: three sets of data:

The structural data consist of data describing the infrastructure of the network and installed pieces of equipment (valves, sensors, pumps, etc.).

The parameters of implementation of the method are set automatically in a preparatory phase, itself automated in order to make resetting possible when the system detects a loss of performance or a variation in its infrastructure.

The operational data result from all of the measurement systems present in the network. When they are available, these data will also include, inter alia, remotely read consumption data, customer complaints and interventions having an effect on the behaviour of the network.

BRIEF DESCRIPTION TO THE DRAWING

The sole FIGURE provides a flow chart of main steps of a preferred embodiment of the invention.

Elementary Methods (See Sole FIGURE)

Preprocessing of the Time Series of Measurements

These methods allow time series of measurements that are optionally padded, smoothed/cleaned of noise to be obtained. The resulting time series are then ready to be used as input data of the characteristic-extracting algorithms. Series are also combined into aggregate signals. For example, the algebraic sum of the time series of input/output flow rates of a water district may be converted into a series of consumptions of the water district.

The series may also be converted (for example standardized) to meet the needs of certain of the algorithms used in the characteristic-extracting phases.

Extraction of Characteristics Resulting from the Decomposition of the Signal

This method consists in using the time series cleaned/smoothed beforehand as described above, in order to extract therefrom relevant information allowing the state of an entity to be operationally characterized. It is a question of producing information summarizing the structure of the series (Fourier decomposition, wavelet decomposition, decomposition into its main components, etc.) while decreasing the complexity thereof in order to concentrate on the most relevant portion of the signals.

The various decomposition bases are evaluated periodically in order to monitor the performance of the algorithms and update the bases when the latter are judged not to be selective enough (supervision).

The outputs of these algorithms are therefore vectors of characteristics summarizing each signal in a time window defined by the network operator.

Extraction of Industry Characteristics

The construction of industry characteristics of a location is automated and based on:

a referential system of characteristics established from past experience for networks of different types; and an observation of the structure and behaviour of the targeted network.

The construction may for example be based on calculation of minima of a parameter in a given time window, the observation of the periodicity of filling/emptying cycles of reservoirs, the average level of consumption of remotely read meters as a function of their consumer segment, etc.

Algorithms for Evaluating the Operating State of the Entity—Operating Regime

According to one important particularity of the invention, to describe the operating state of the network, data resulting from industry expertise is combined with those resulting from methods for decomposing the signal. These data enrich one another and deliver as output for each entity a vector completely characterizing an operating state of this entity for the network in question.

Using characteristic vectors, the operating state of the entity in question at a given time in a given time window, or its "regime", may be characterized. It may then be compared to prior states, or to the states of other entities, and classed depending on operational criteria implying actions to be performed. To carry out this categorization, machine learning tools such as classification and clustering tools may be implemented.

In the case of classification, a learning process will have allowed beforehand, using historical data marked with the various possible states and forming groups, a discriminating function (classifier) to have been trained, thereby allowing the group to which the new state belongs to be automatically determined.

This discriminating function may be obtained by optimizing a quality criteria, for example an inertia function in an unsupervised mode or the proxy of a classification error in a supervised mode.

In the case where no marked historical data are available, classification generation (clustering) techniques allow the states to be grouped depending on similarity criteria and thus those that belong to the least represented categories to be identified.

The latter will be of interest to the network operator since they indicate a behaviour that is out of the ordinary. The operator may then focus his attention on this entity.

Anomaly-Detecting Algorithms

Anomaly-detecting algorithms are applied to the state-characterizing vectors. It is a question of characterizing an event that is underway or that has recently terminated. The type of event corresponds to a category of events followed by the operators of drinking water networks (leaks, pressure drop, sensor failure, consumption anomaly, etc.).

The detecting algorithms are initiated in parallel and their results are aggregated in order to identify entities having an abnormal behaviour. They have been trained beforehand using sets of historical data, in order to adapt their parameters to the operational constraints of the network.

Corollary Particularities

The assembly consisting of the components described above may be connected to the technical information system of the operator of a system for supplying drinking water. Each available source of data is then connected to the characteristic-extracting algorithm that is dedicated thereto. The assembly may be activated regularly, at the data acquisition frequency. The time window in which the analysis is carried out is adjustable by the user. It is nevertheless appropriate to use, as a first approach, time windows of 24 hours and 7 days.

Under these conditions the characterisation of the operating state of the network and the associated anomaly detection are much more pertinent than with the methods conventionally used, and operational effectiveness is considerably improved thereby.

In the phase of diagnosis of past network events, for purposes of operational performance review for example, the method allows considerable time to be saved by discriminating between actual past situations.

The combination of signal-related characteristics and industry characteristics improves the robustness of the anomaly detection.

The adjustment of the sensitivity of the algorithm, i.e. the balance between the number of correct detections and the number of anomalies for each entity, allows, for example, the detection of each type of anomaly to be adapted to the capacity of the operator to plan and perform corrective actions.

EXAMPLE EMBODIMENT: EXAMPLE CHLORINE AND SIGNAL DECOMPOSITION

The use of a signal decomposition method, such as a wavelet or Fourier decomposition, on signals relating to a drinking water network allows the various (intra- and inter-day) components of these signals to be isolated. A cognitive algorithm for analysing these components, in relation to industry expertise, results in the field of definition of normal operation of the network being identified. This allows, when new signals are available, significant changes in the nature of these components to be detected.

Thus, an observed significant divergence may be interpreted as an indicator of abnormal behaviour. A second set of search algorithms may then be executed. For example, an algorithm for classification on the basis of vectors of characteristics (including customer complaints for example) may help to define the risk level reached.

This approach may be applied to monitor water quality by using all the measurement points available in a drinking water network to identify hidden structures and to detect, for example, anomalies in residual chlorine concentration, whether in conjunction or not with other quality parameters. The customer complaints used then relate to the taste of the water.

The invention claimed is:

1. A method for detecting anomalies in a distribution network equipped with sensors, in which method a time series of physical measurements separated by time intervals is acquired for each sensor, said method comprising the following steps:
    defining time windows, each corresponding to a plurality of time intervals;
    extracting operational characteristics of each time series in each time window;
    forming, for each time window, at least one current operational data set that includes each of the operational characteristics, structural data relating to the network, and situational characteristics specific to the time window;
    comparing the current operational data set with preceding operational data sets corresponding to preceding time windows and the situational characteristics and structural data of which are similar to those of the current operational data set; and
    signalling an anomaly in cases where the current operational data set is significantly dissimilar to said preceding operational data sets.

2. The method according to claim 1, wherein for the comparing of the current operational data set with the preceding operational data sets a sensitivity defining a minimum degree of dissimilarity is adjusted so that the current operational data set is qualified as significantly dissimilar.

3. The method according to claim 1, wherein for the extracting of the operational characteristics, time series of measurements are aggregated.

4. The method according to claim 1, wherein the situational characteristics are at least in part based on hypotheses resulting from experience.

5. The method according to claim 1, wherein in case of an anomaly, the current operational data set is compared with at least one preceding operational data set having similar situational characteristics and operational characteristics as close as possible to those of the current operational data set, and at least one operational characteristic that differs greatly between the current operational data set and said at least one preceding operational data set is signalled.

6. The method according to claim 1, further comprising:
    delivering a result with reference to a severity scale of the anomaly.

7. The method according to claim 1, wherein in case of a plurality of simultaneous anomalies, the anomalies are prioritized as a function of their urgency and/or as a function of the magnitude of the corresponding corrective intervention.

8. The method according to claim 1, wherein an anomaly-free operational data set is classed in a same memory compartment as other substantially equipollent operational data sets, and each time a current operational data set is calculated a memory compartment containing prior operational data sets that most resembles said current operational data set is searched, and the current operational data set is compared only with preceding operational data sets of said compartment.

9. The method according to claim 8, wherein a new memory compartment is created for an operational data set if situational coordinates and/or coordinates of the operational data set corresponding to structural data of the network do not correspond to an existing compartment.

10. The method according to claim 1, wherein a variation over time of the operational data sets of a given compartment is analysed and information on the variation in the network is provided.

11. The method according to claim 10, wherein variations in various compartments are compared and information is provided that distinguishes a variation due to a state of the network from a variation due to consequences of situational parameters on the network.

12. The method according to claim 1, wherein for each time window, a plurality of operational data sets is provided, each corresponding to a respective subnetwork forming part of the network.

13. The method according to claim 1, wherein the characteristics extracted from the time series comprise maxima, minima and/or averages.

14. The method according to claim 1, wherein the characteristics extracted from the time series comprise elementary frequencies in particular obtained by decomposition of the time series into Fourier series.

15. The method according to claim 1, wherein in case of detection of an anomaly, the current operational data set is analysed comparatively with the preceding operational data sets in order to provide an indication of a rate of variation of the anomaly and/or of a link between the anomaly and at least one situational parameter and/or structural datum.

16. The method according to claim 1, wherein in an initialization step, a memory is loaded with operational data sets formed from archives relating to the network.

17. The method according to claim 1, wherein the method is implemented simultaneously for time windows of different durations.

18. The method according to claim 1, wherein the components of an operational data set include complaints of consumers supplied by the network.

19. The method according to claim 1, wherein situations giving rise to at least one anomaly being signalled are processed by an anomaly-characterizing software package.

20. The method according to claim 1, wherein in case of an anomaly, comparable anomalies that gave rise to a diagnosis are sought among preceding operational data sets in order to provide for the cause of the current anomaly a pre-diagnosis similar to a prior diagnosis.

21. The method according to claim 1, wherein the distribution network is a network that distributes a Newtonian fluid.

22. The method according to claim 1, wherein the distribution network is a network that supplies drinking water.

* * * * *